US011854405B2

(12) United States Patent
Menadue

(10) Patent No.: US 11,854,405 B2
(45) Date of Patent: Dec. 26, 2023

(54) PERFORMING VEHICLE LOGISTICS IN A BLOCKCHAIN

(71) Applicant: International Business Machines Corporation, Armonk, NY (US)

(72) Inventor: Andrew J. E. Menadue, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 16/001,281

(22) Filed: Jun. 6, 2018

(65) Prior Publication Data

US 2019/0378418 A1    Dec. 12, 2019

(51) Int. Cl.
| G05D 1/02 | (2020.01) |
| H04L 9/32 | (2006.01) |
| H04L 9/00 | (2022.01) |
| G08G 1/00 | (2006.01) |
| H04W 4/46 | (2018.01) |

(52) U.S. Cl.
CPC .............. *G08G 1/22* (2013.01); *G05D 1/0295* (2013.01); *G08G 1/20* (2013.01); *H04L 9/3247* (2013.01); *H04W 4/46* (2018.02); *H04L 9/50* (2022.05)

(58) Field of Classification Search
CPC .......... G08G 1/22; G08G 1/20; G05D 1/0295; H04W 4/46; H04W 12/00; H04L 9/3247; H04L 2209/38; H04L 9/3239; H04L 2209/84
See application file for complete search history.

(56) References Cited

U.S. PATENT DOCUMENTS

| 8,855,835 | B2 | 10/2014 | Kumabe | |
| 9,037,389 | B2 | 5/2015 | You | |
| 9,224,300 | B2 | 12/2015 | Lee et al. | |
| 9,494,944 | B2 | 11/2016 | Alam et al. | |
| 10,650,621 | B1* | 5/2020 | King | .......................... H04L 67/10 |
| 10,988,042 | B1* | 4/2021 | Chase | ................... B60L 53/305 |
| 2003/0182183 | A1* | 9/2003 | Pribe | ........................ G08G 1/22 705/13 |
| 2016/0325432 | A1* | 11/2016 | Tian | ........................ B25J 19/023 |
| 2017/0046652 | A1 | 2/2017 | Haldenby et al. | |
| 2017/0293296 | A1* | 10/2017 | Stenneth | ............ G01C 21/3438 |

(Continued)

FOREIGN PATENT DOCUMENTS

| EP | 3525157 A1 * | 8/2019 | ............... G05D 1/00 |
| WO | 2014092628 A1 | 6/2014 | |

OTHER PUBLICATIONS

Jose Angel Leon Calvo and Rudolf Mathar, Secure Blockchain-Based Communication Scheme, Jun. 1, 2018 for Connected Vehicles, 2018 European Conference on Networks and Communications (EuCNC (Year: 2018).*

(Continued)

*Primary Examiner* — Jess Whittington
*Assistant Examiner* — Terry C Buse

(57) ABSTRACT

An example operation may include one or more of identifying one or more blockchain members of a vehicle platoon placement group, receiving a request to perform a task from the blockchain members, creating a scheduled task date associated with the task, notifying the blockchain members of the scheduled task date, receiving task progress updates corresponding to the blockchain members, and storing the task progress updates in a blockchain.

20 Claims, 12 Drawing Sheets

(56) References Cited

U.S. PATENT DOCUMENTS

| | | | |
|---|---|---|---|
| 2017/0308097 A1 | 10/2017 | Switkes et al. | |
| 2017/0349176 A1* | 12/2017 | Alden | G05D 1/0293 |
| 2018/0188746 A1* | 7/2018 | Lesher | G05D 1/0287 |
| 2018/0267539 A1* | 9/2018 | Shih | G06N 10/00 |
| 2019/0275894 A1* | 9/2019 | Amacker | G06Q 20/3674 |
| 2019/0299927 A1* | 10/2019 | Ando | H04L 9/3239 |
| 2021/0312558 A1* | 10/2021 | Floyd | H04L 9/3239 |

OTHER PUBLICATIONS

Anonymous, Fleet Complete, First Among Telematics Service Providers to Join Blockchain in Trucking Alliance (BiTA), Magazine/Journal Publication Ttl: PR Newswire, Toronto Aug. 21, 2017.

* cited by examiner

PERFORMING VEHICLE LOGISTICS IN A BLOCKCHAIN

TECHNICAL FIELD

This application generally relates to vehicle logistics in a blockchain, and more specifically to performing vehicle travel management based on a blockchain organized result outcome model for performing vehicle logistics in the blockchain.

BACKGROUND

A blockchain may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

In today's vehicle fleet management configurations, many vehicles are attempting to participate in vehicle platoons, which provide a certain number of vehicles traveling together on a highway. The objective in such fleets is to save fuel by sharing a common direction of travel by using a series of vehicles which create a wind resistant blockade for vehicles traveling behind a lead vehicle. Also, sharing cargo and transport services are also possible when organizing a vehicle platoon. The lead vehicle should be rewarded for performing the lead effort and experiencing the most wind resistance, which in turn yields more fuel costs, while the following vehicles are able to receive the benefit of less wind resistance and added fuel savings. Communications and other constraints between the vehicle operators and the corresponding management organizations are limiting factors which reduce the likelihood that such vehicle platooning can be setup and performed. Also, a common platform for providing result outcomes to those willing to perform the leading efforts and to those accepting the follow positions could optimize the number and frequency of vehicle platoons which are setup and performed on the roads today.

SUMMARY

One example embodiment may provide a method that includes one or more of identifying one or more blockchain members of a vehicle platoon placement group, receiving a request to perform a task from the one or more blockchain members, creating a scheduled task date associated with the task, notifying the one or more blockchain members of the scheduled task date, receiving task progress updates corresponding to the one or more blockchain members, and storing the task progress updates in a blockchain.

Another example embodiment may include a system that includes one or more blockchain member devices operated by one or more blockchain members of a vehicle platoon placement group, a computing node configured to identify the one or more blockchain members, receive a request to perform a task from the one or more blockchain members, create a scheduled task date associated with the task, notify the one or more blockchain member devices of the scheduled task date, receive task progress updates corresponding to the one or more blockchain members, and a blockchain configured to store the task progress updates as blockchain transactions.

Yet another example embodiment may include a non-transitory computer readable storage medium configured to store instructions that when executed cause a processor to perform identifying one or more blockchain members of a vehicle platoon placement group, receiving a request to perform a task from the one or more blockchain members, creating a scheduled task date associated with the task, notifying the one or more blockchain members of the scheduled task date, receiving task progress updates corresponding to the one or more blockchain members, and storing the task progress updates in a blockchain.

DETAILED DESCRIPTION

Figure 1A:
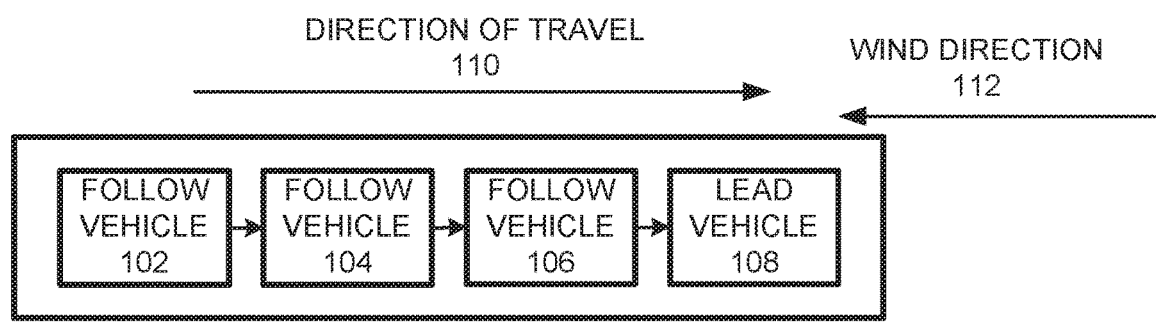
FIG. 1A illustrates a logic diagram of a vehicle platoon configuration, according to example embodiments.

It will be readily understood that the instant components, as generally described and illustrated in the figures herein, may be arranged and designed in a wide variety of different configurations. Thus, the detailed description of the embodiments of at least one of a method, an apparatus, a non-transitory computer readable medium and a system, as represented in the associated figures and description, is not intended to limit the scope of the application, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of messages or network data, such as, packet, frame, datagram, etc. Furthermore, while certain types of messages, signaling and protocols may be depicted in exemplary embodiments they are not limited to a certain type of message, signaling or protocol.

Example embodiments provide methods, devices, networks and/or systems, which support a blockchain used to manage fleet organizations. In one example, a fleet of vehicles, such as cargo trucks/18-wheelers may be identified as members of the blockchain. The vehicles may be setup to transfer information over a vehicle-to-vehicle (V2V) link. The V2V link may be an adhoc wireless network configured across any number of vehicles. The V2V link and/or a GPS configuration may be used to identify location information of vehicles, which may be capable of potentially joining a vehicle platoon, and/or to track vehicle movement of vehicles currently operating in a platoon. The vehicles must be tracked to ensure compliance with the platoon, for example, to provide a result outcome to a leader vehicle for successfully leading a group of vehicles for a certain distance. The position information of the leader and the followers may be tracked over time to determine whether the platoon event actually occurred.

Blockchain transactions may be created and stored to represent new member registrations, requests for future platoon participation, dates of travel, agreements to be a leader/follower, organization information, etc. As platoon events occur, additional blockchain transactions may be posted in the blockchain to include information about an amount of time a platoon member has spent at the head of any platoon and/or as a follower in a platoon. This time frame of performing a lead vehicle role could be represented as a result outcome that is added to the blockchain once a platoon has agreed that a member has performed enough time at the front lead position. Returns may be provided in a mileage sense, such as so many returns per mile and/or upon completion of an agreed upon distance of travel.

Additional factors to consider are the make and model of the vehicles, engine type, and position in the platoon, some vehicle aerodynamics may provide a benefit to other vehicle even in a second position of the platoon. Each position in the platoon may gain/lose a different amount of result outcome per unit time based on the exact position and vehicle type. For more efficient auditing purposes, a record of all the platoons participating by any of the current members may be identified to calculate a time spent at the head of the platoon(s).

According to one example, a result outcome value scheme could be used where leading a platoon is approximately 15% more fuel efficient generally. A result is allocated at a higher result for leading and a lesser result for other members, calculated on a minute-by-minute basis. The scheme could be agreed to by all members of a scheme that used a blockchain in this manner. The result outcome is gained by being at the head of a platoon for a period of time. This head or lead position is the only position in the platoon that is at a disadvantage from a fuel saving point of view, and thus the results that are allocated to a lead member are for the disadvantage of performing a lead effort.

When a new member requests to join a platoon, the new member will have their level assessed, and will join the platoon in a position that depends on that level. The ideal situation is that the member with the lowest level is the leader, this will cause that member to gain a larger result with respect to the other members. At some point, that member will have accrued enough results to not be the member with the lowest result outcome or rank. At that point, the platoon could rearrange and select a new leader, or permit the leader to accrue more rank by remaining as a leader. The decision on when to change leaders depends on a rank difference between members of the platoons and a level of difference that is acceptable across all members of the platoon(s). For example, once a leader has receive a certain amount of results or rank, the leader may be eligible to follow. This level may require a threshold amount of rank compared to other members' levels. This can be performed by re-arranging platoons when the leader has received a larger difference result outcome and by requiring new members to lead a platoon if they have a smaller rank, or by refusing them membership.

FIG. 1A illustrates a logic diagram of a vehicle platoon configuration, according to example embodiments. Referring to FIG. 1A, the configuration 100A provides an example group of vehicles (i.e., platoon) including four vehicles 102-108. There is only one lead vehicle 108 and the rest are followers in this example. The direction of travel 110 is a common direction shared by each of the platoon members along with the wind direction 112 which is naturally in the opposite direction of the vehicle travel due to normal wind resistance conditions.

Figure 1B:
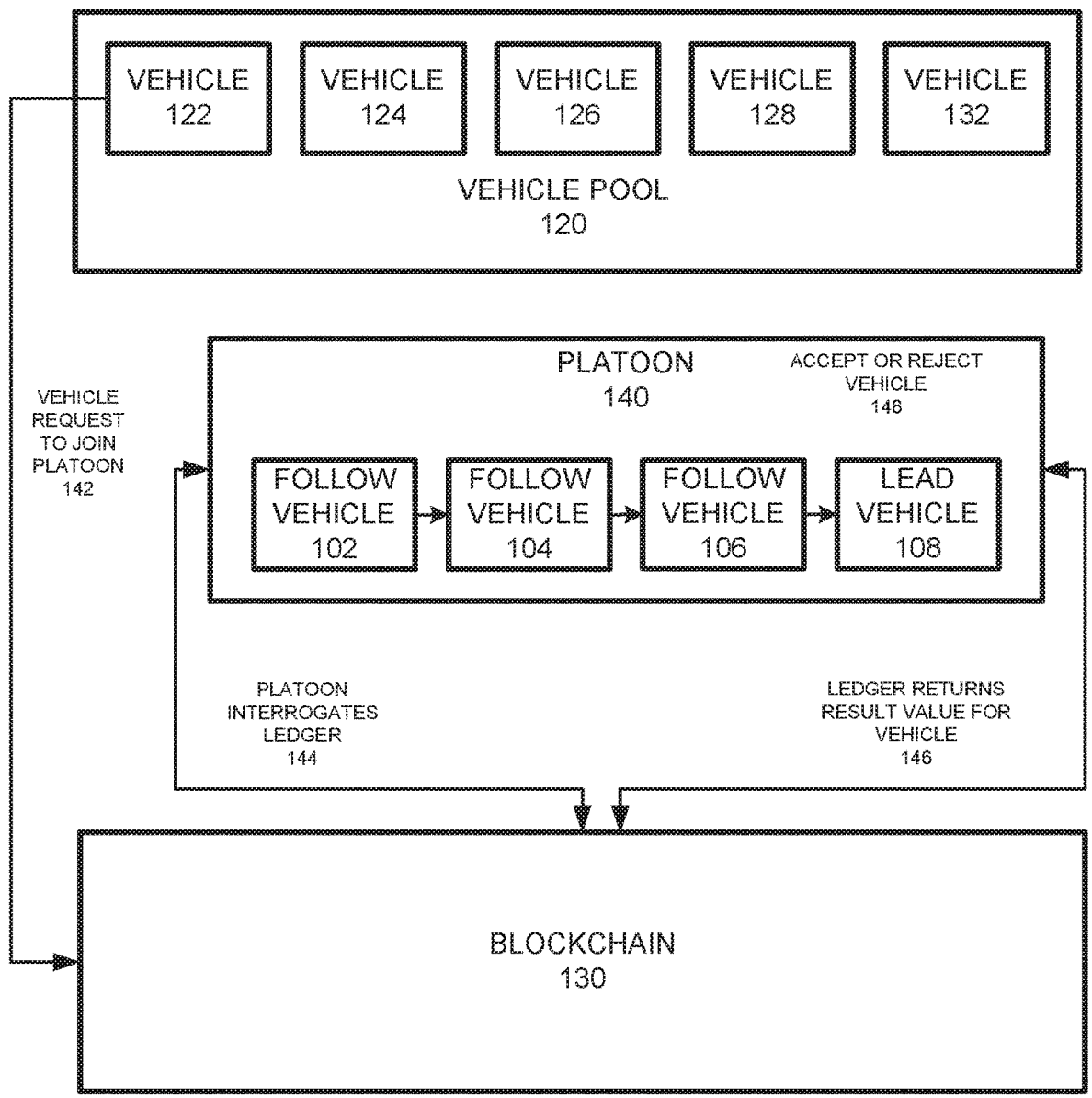
FIG. 1B illustrates a logic diagram of a vehicle platoon configuration using a blockchain management platform, according to example embodiments.

FIG. 1B illustrates a logic diagram of a vehicle platoon configuration using a blockchain management platform, according to example embodiments. Referring to FIG. 1B, the configuration 100B illustrates the platoon 140 being organized and operated from vehicles in a vehicle pool 120 of available vehicles which are registered or are attempting to register with the blockchain 130 and participate in a platoon organization effort. The vehicles in the vehicle pool 122-132 may all be candidates for selection by the blockchain organization effort, which may include a smart contract stored in the blockchain with terms for participating in a platoon, which must be adhered to prior to being accepted by the other members in a consensus agreement vote to accept the new member(s).

In one example method of operation, one or more of the vehicles in the vehicle pool 120 may request 142 to join a platoon, either a platoon planned in the future or a specific platoon identified by a schedule of existing platoons stored in the blockchain. The request is received and processed by the blockchain 130 and may cause a smart contract to be invoked to determine vehicle eligibility. For example, certain vehicle types may be ineligible, also certain companies may not have a platoon sharing status agreement and thus may be ineligible for that reason alone. Once the terms are met, the other vehicles may be required to vote the new member into the group of potential platoon members. Or, the smart contract may be setup to automatically invoke the newest vehicle as a potential new candidate to the vehicle candidate pool 120, provided certain conditions are met. The platoon members may interrogate the ledger 144 to identify the potential candidates and the ledger may return a result value 146 for a vehicle that has successfully completed a lead operation, assuming the vehicle has been accepted 148 by the platoon members.

Figure 1C:
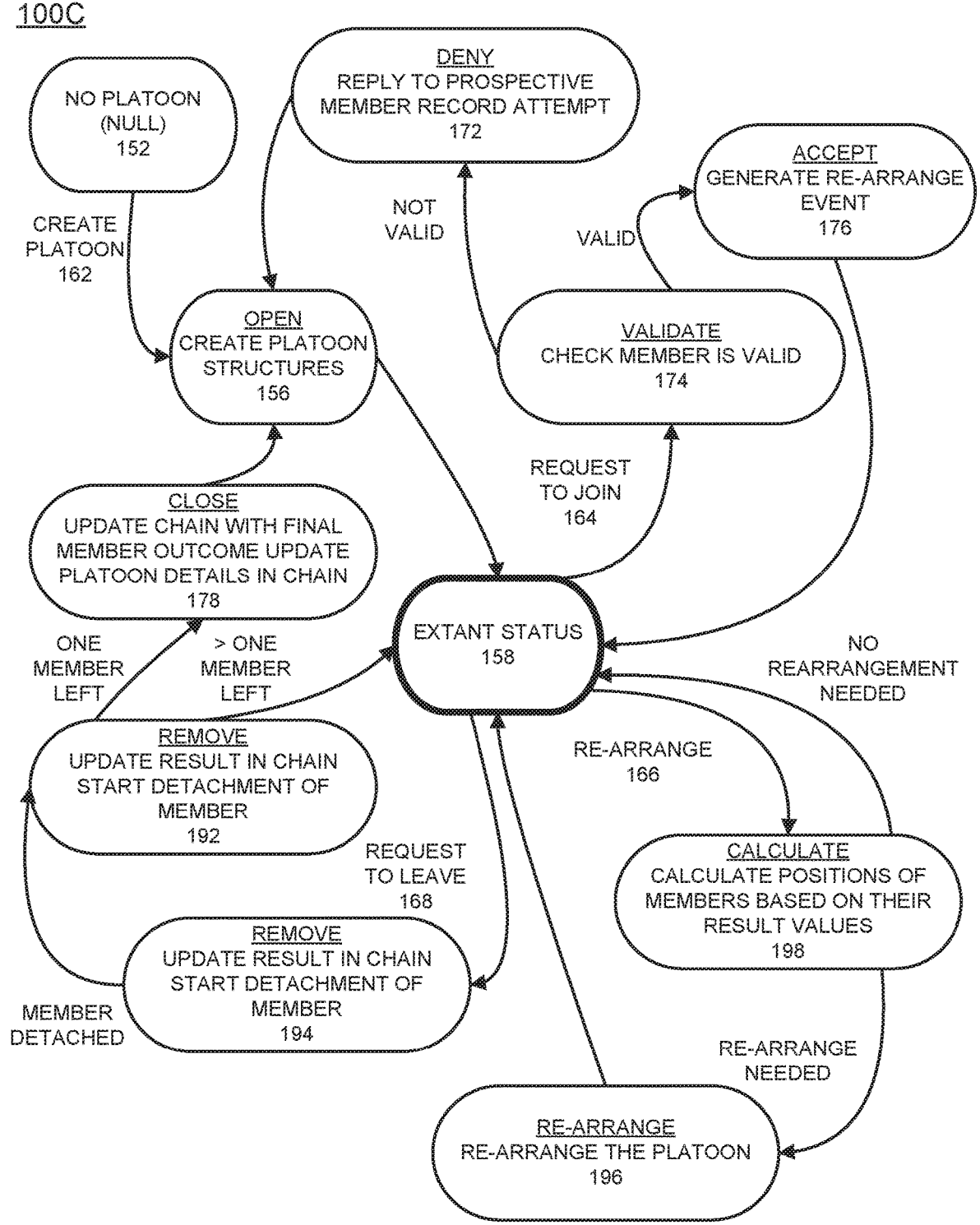
FIG. 1C illustrates a state diagram of a vehicle platoon management configuration using a blockchain platform, according to example embodiments.

FIG. 1C illustrates an example state diagram configuration for managing the operation of a vehicle platoon fleet. Referring to FIG. 1C, the configuration 100C provides an initial state of null or no platoon 152 being created at the current time. Once the platoon creation process 162 has initiated, the platoon status may be open 156 and may begin invoking new participants based on a smart contract assigned to the platoon creation procedure. The extant status 158 represents the ongoing available state of the procedure. A request to join the platoon fleet may be identified from one or more candidate vehicles 164, at which point the membership may be validated 174 based on membership status, compliance status (i.e., vehicle metrics required), and if the candidate is valid then an acceptance 176 may be identified so the fleet is arranged to include the new member(s). If one or more requirements are not met, the membership may be denied 172 for not being valid. The new members can then be re-arranged 166 as new members are included based on their ranks and timing of entering the fleet. Such criteria may be used to calculate the positions of the members 198 according to their priorities for being in the fleet order, such as first come first serve, history of fleet experience, current rank and/or current result outcome status. When newer members join, the order may be reordered based on those metrics 196. Also, request to leave a fleet 168 may be received and used to update the blockchain membership information of the current fleet and those entering/leaving the fleet 194. As a member is detached from the fleet, a removal status may be updated to include a new blockchain transaction 192. If there is one member left the final update may be performed 178 to provide the final result outcome for that fleet effort. If there is still more than one member left the extant status 158 may be preserved for future membership opportunities.

Figure 2A:
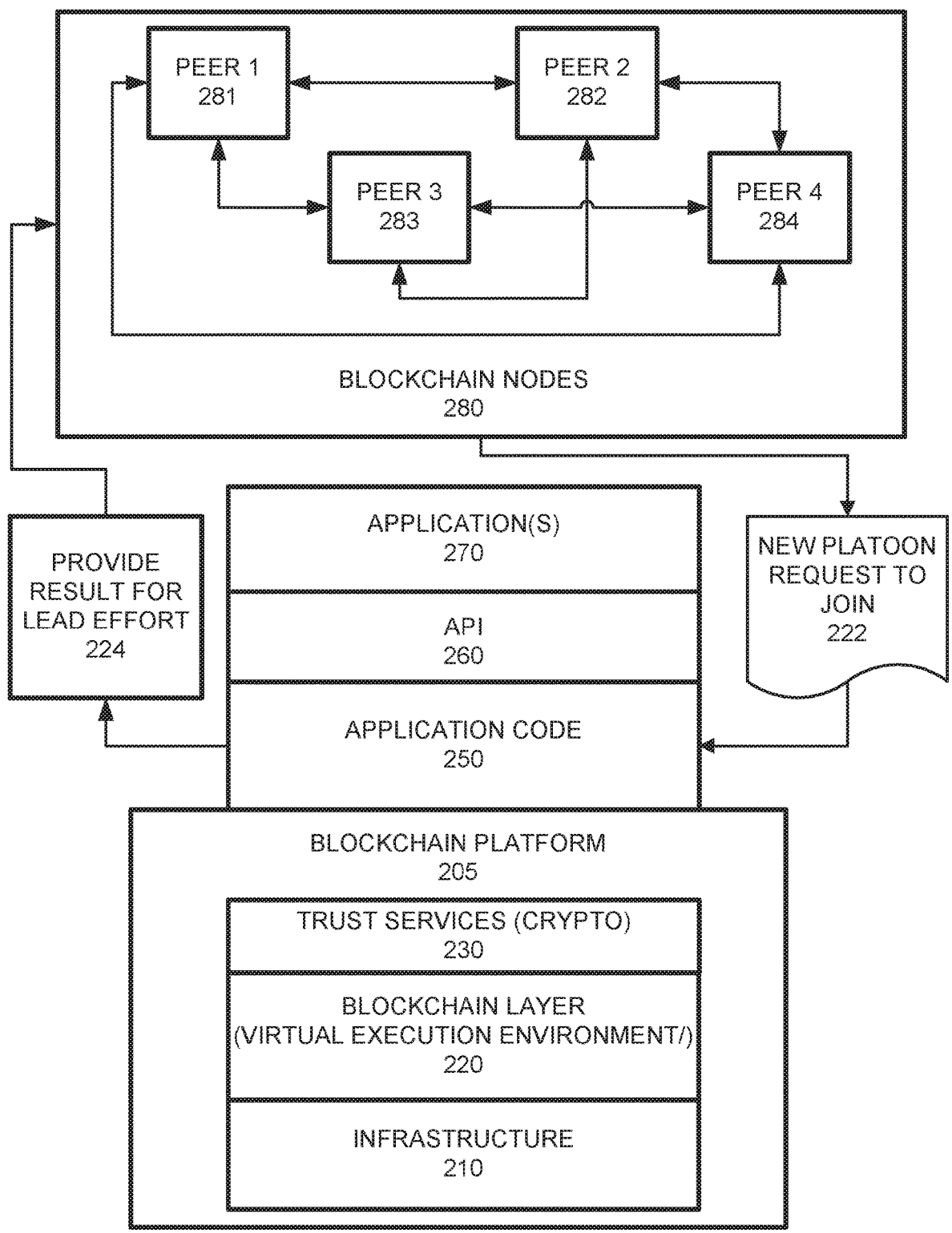
FIG. 2A illustrates an example peer node blockchain architecture configuration for a vehicle management configuration, according to example embodiments.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-284 may provide an ordering service for all blockchain nodes in the architecture 200A. A blockchain node may initiate a blockchain authentication and attempt to write to a blockchain immutable ledger stored in blockchain layer 220, a copy of which may also be stored on the underpinning physical infrastructure 210. The blockchain configuration may include one or more applications 270, which are linked to application programming interfaces (APIs) 260 to access and execute stored program/application code 250 (e.g., chaincode, smart contracts, etc.), which can be created according to a customized configuration sought by participants and can maintain their own state, control their own assets, and receive external information.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In one example, a new request to join a platoon or blockchain configured for platoon management 222 may be received and processed by the peers and/or a smart contract in the blockchain application code 250. A decision to approve the new member may be performed by the nodes and/or the criteria included in the smart contract. Once approved, the leaders of a platoon task may be identified 224 for any lead effort and the final result outcome will be adjusted for any non-lead participation effort and/or any lead efforts.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. In operation, the chaincode may receive a hash and retrieve from the blockchain a hash associated with the data template created by a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
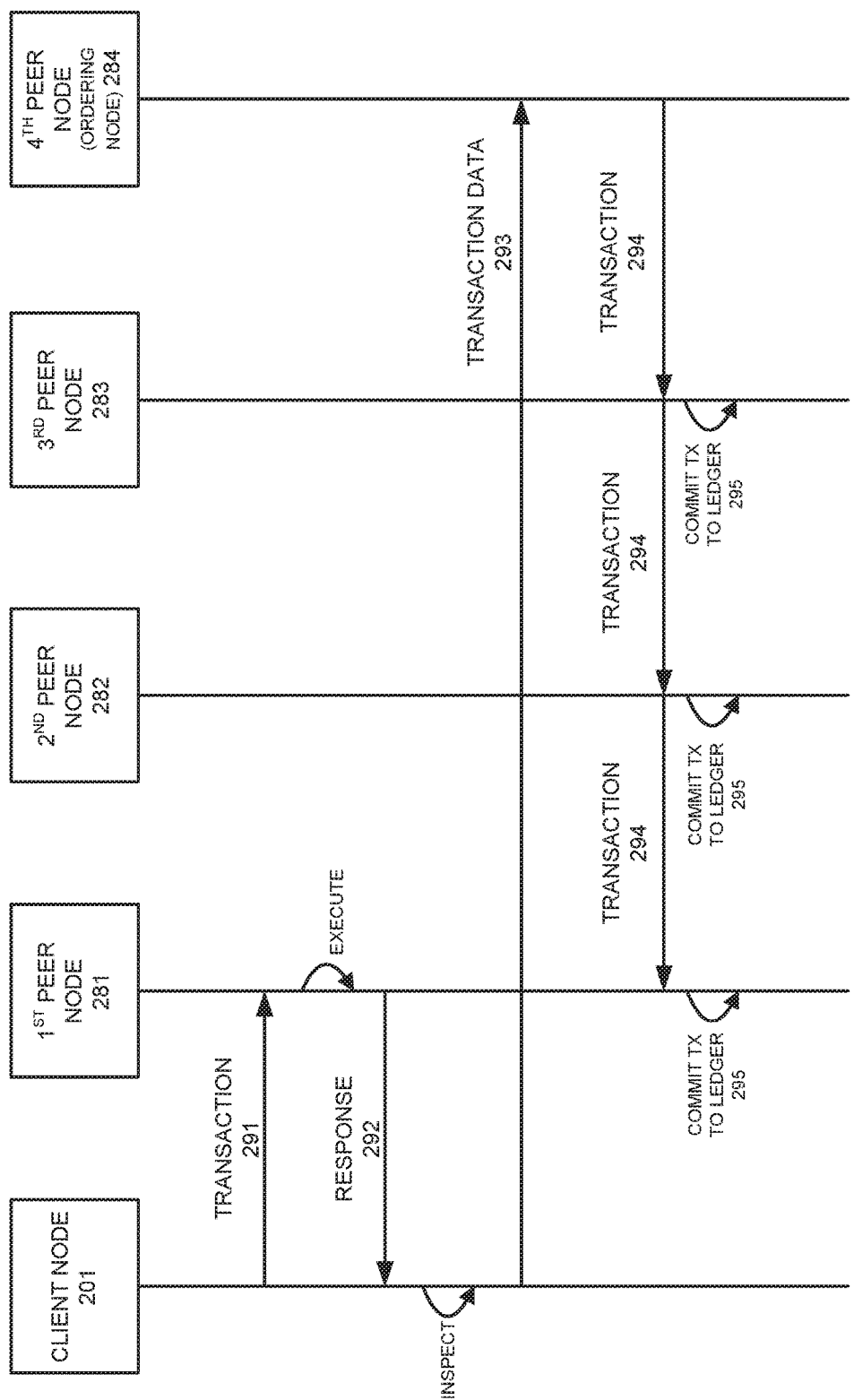
FIG. 2B illustrates an example peer node blockchain configuration, according to example embodiments.

FIG. 2B illustrates an example of a transactional flow 200B between nodes of the blockchain in accordance with an example embodiment. Referring to FIG. 2B, the transaction flow may include a transaction proposal 291 sent by an application client node 201 to an endorsing peer node 281. The endorsing peer 281 may verify the client signature, and execute a chaincode function to simulate the transaction. The output may include the chaincode results, a set of key/value versions that were read in the chaincode (read set), and the set of keys/values that were written in chaincode (write set). The proposal response 292 is sent back to the client 201 along with an endorsement signature, if approved. The client 201 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results, and authenticated the signatures against the transaction payload 293.

Referring again to FIG. 2B, the client node 201 initiates the transaction 291 by constructing and sending a request to the peer node 281, which is an endorser. The client 201 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 201 which parses the payload for the application to consume.

In response, the application of the client 201 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
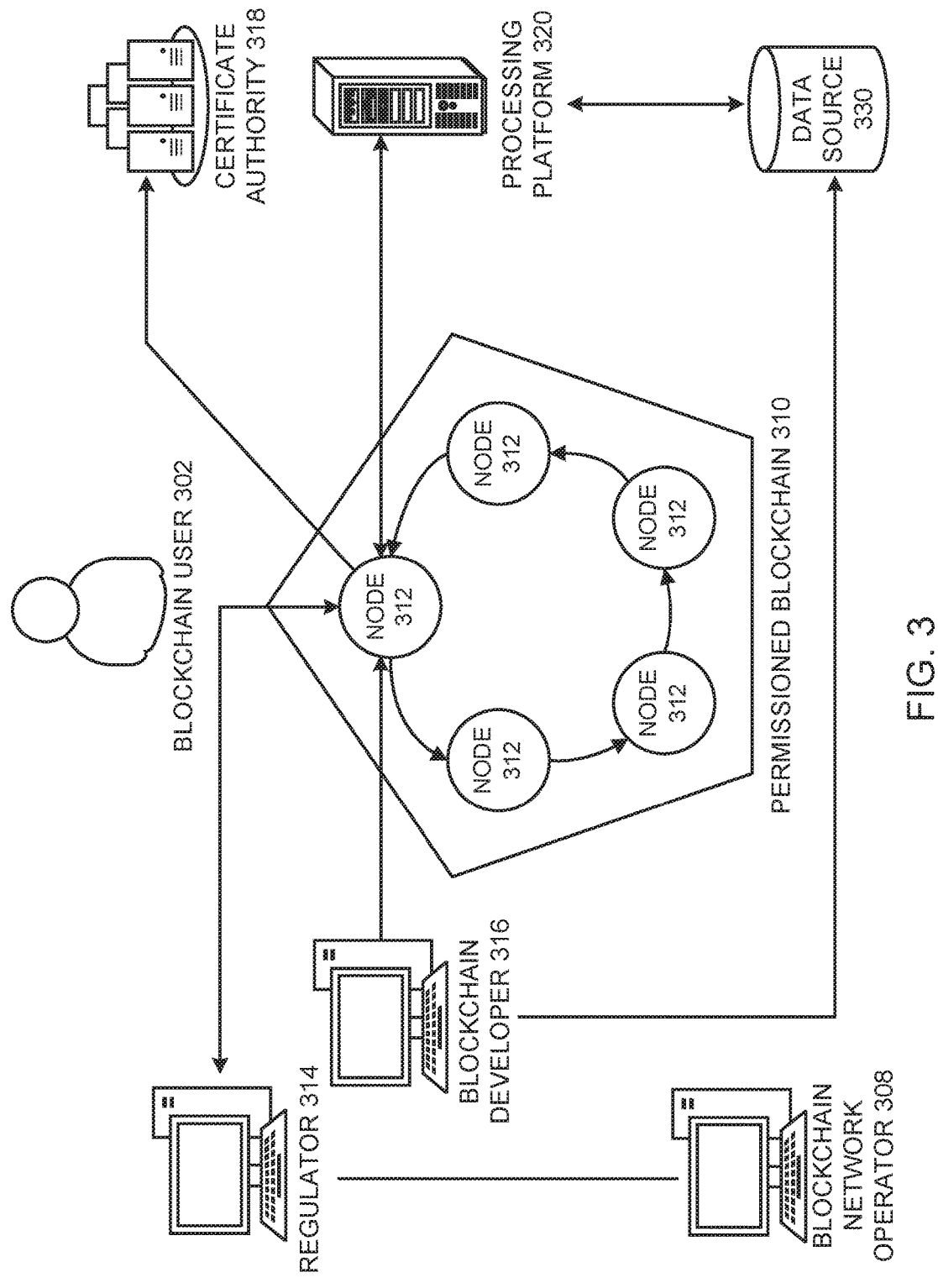
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator node 308 manages member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
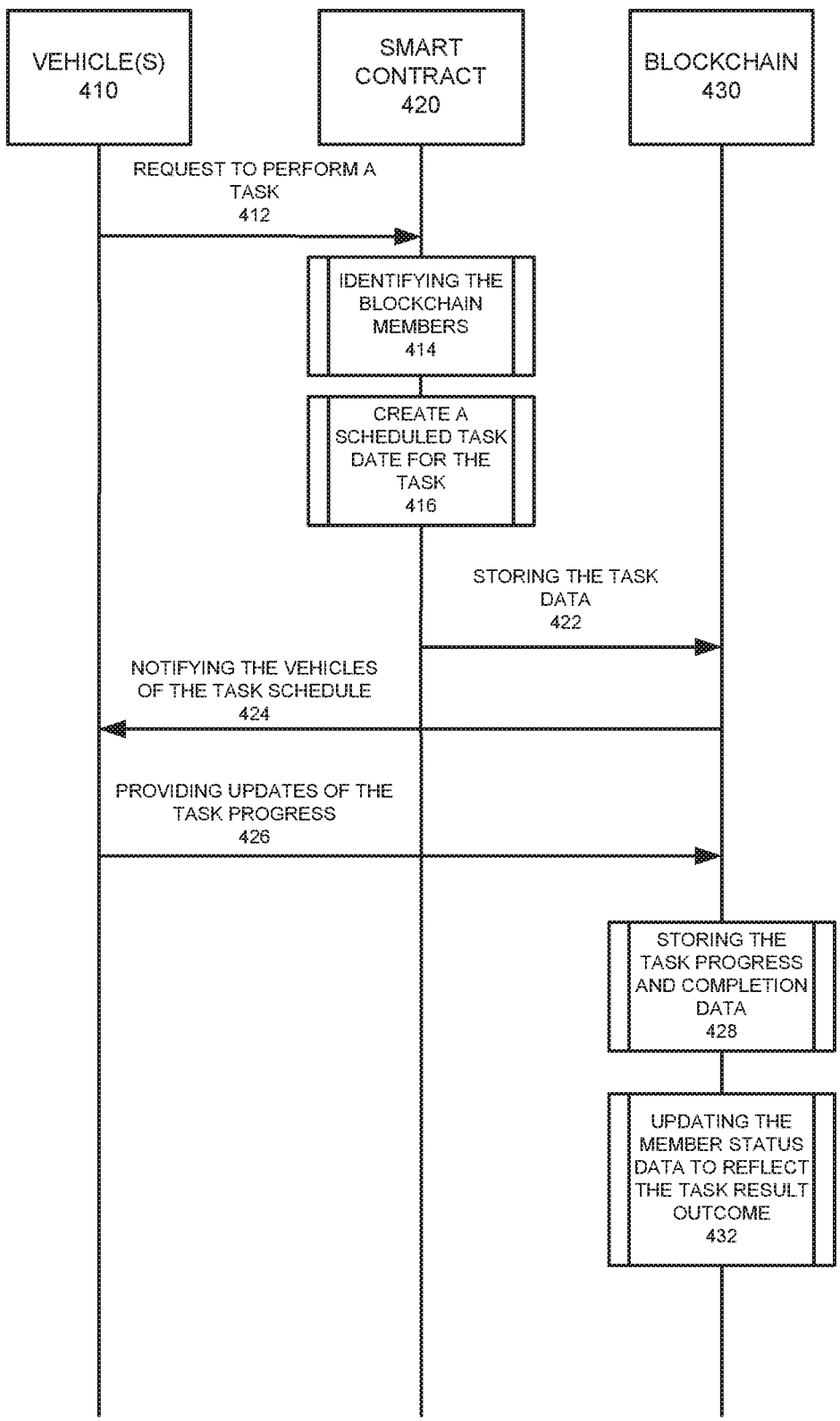
FIG. 4 illustrates a system messaging diagram for performing a vehicle management system in a blockchain, according to example embodiments.

FIG. 4 illustrates a system messaging diagram for performing platoon management, according to example embodiments. Referring to FIG. 4, the system 400 provides vehicles 410, a smart contract 420 and a blockchain 430. The process may include receiving a request to perform a task 412, identifying the current and future requesting members of the blockchain group 414, creating one or more tasks and/or dates for task execution and scheduling certain members for the tasks 416 and storing the related information 422 in the blockchain 430. The vehicle members may be notified 424 on their corresponding smart devices associated with their blockchain profiles. Once engaged in the task, the blockchain may be configured to log progress during the task execution and provide updates of the task progress 426 to the blockchain 430, which stores the task progress information 428, such as position information of each of the vehicles, and updates the member status data to modify result outcomes 432 for the task efforts.

Figure 5A:
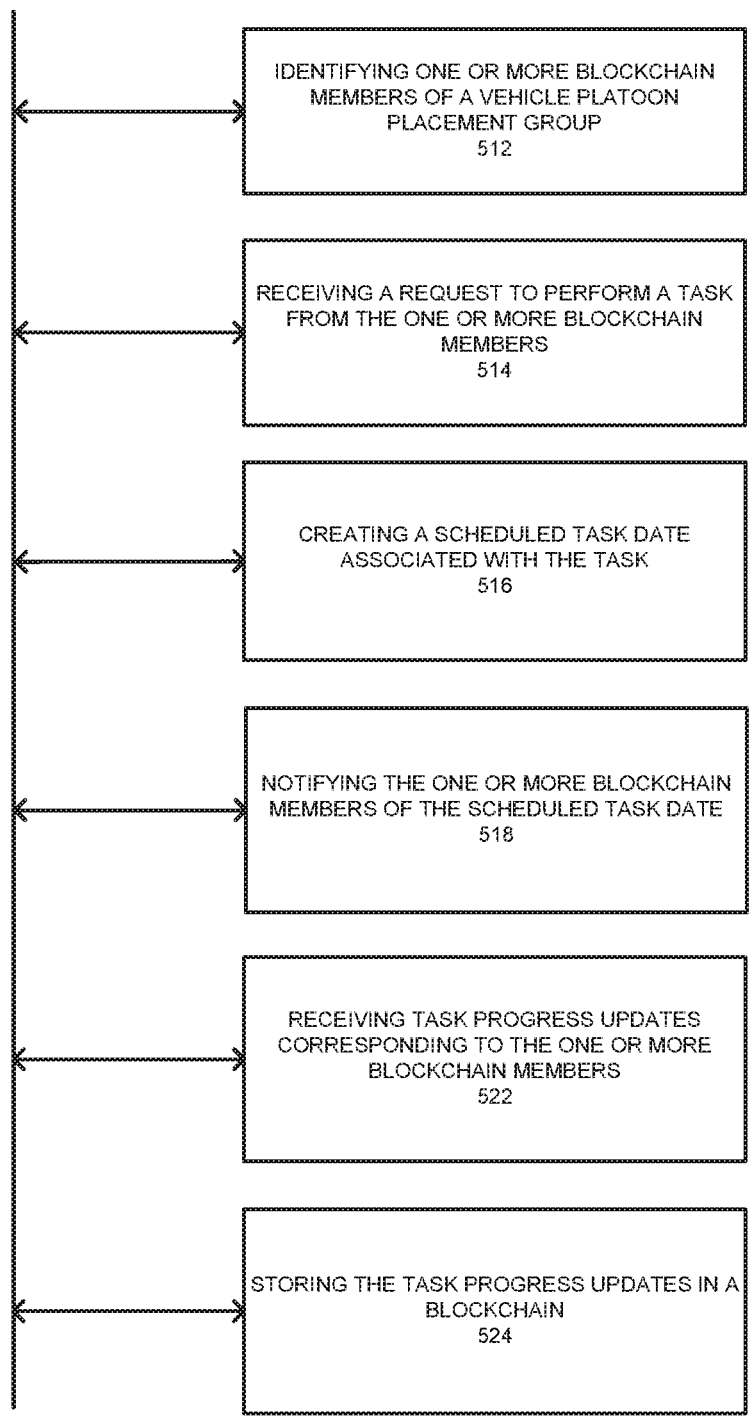
FIG. 5A illustrates a flow diagram of an example method of managing a vehicle platoon in a blockchain, according to example embodiments.

FIG. 5A illustrates a flow diagram of an example method of managing a vehicle platoon in a blockchain, according to example embodiments. Referring to FIG. 5A, the method 500A may include a method that provides identifying one or more blockchain members 512, receiving a request to perform a task from the one or more blockchain member 514, creating a scheduled task date associated with the task 516, notifying the one or more blockchain members of the scheduled task date 518, receiving task progress updates corresponding to the one or more blockchain members 522, and storing the task progress updates in a blockchain 524. The blockchain members may belong to a vehicle platoon placement group and the task could be one or more of a vehicle platoon lead effort and a vehicle platoon follow effort. The method may also include identifying position data of a plurality of vehicles participating in the task on the scheduled task date, and determining the position data is accurate. The determining of the position data being accurate includes identifying vehicle positions of a plurality of vehicles participating in the task, and other operations provide determining whether the blockchain members should receive a result outcome for their participation in a vehicle platoon follow effort, and storing blockchain transactions for each of the blockchain members which participated in the task with the result outcome. The larger result outcome is provided to a member which performed a vehicle platoon lead effort and a lesser result outcome is provided to members which performed a vehicle platoon follow effort.

Another example embodiment may include a system that includes one or more blockchain member devices operated by one or more blockchain members, such as mobile devices registered with a computing node, such as a virtual machine or other computing entity designated to enforce a smart contract and submit transactions to a blockchain. The system may be configured to identify the one or more blockchain members, receive a request to perform a task from the one or more blockchain members, create a scheduled task date associated with the task, notify the one or more blockchain member devices of the scheduled task date, receive task progress updates corresponding to the one or more blockchain members, and a blockchain configured to store the task progress updates as blockchain transactions.

Figure 5B:
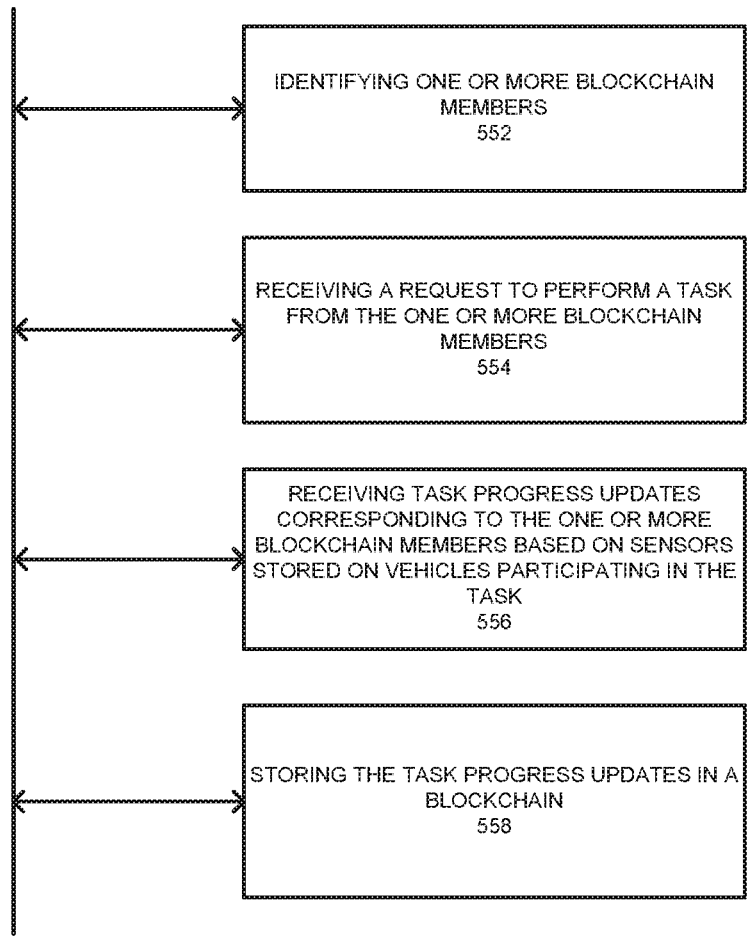
FIG. 5B illustrates a flow diagram of another example method of managing a vehicle platoon in a blockchain, according to example embodiments.

FIG. 5B illustrates a flow diagram of another example method of managing a vehicle platoon in a blockchain, according to example embodiments. Referring to FIG. 5B, the method 500B may include a method that includes identifying one or more blockchain members 552, receiving a request to perform a task from the one or more blockchain members 554, receiving task progress updates corresponding to the one or more blockchain members based on sensors stored on vehicles participating in the task 556, and storing the task progress updates in a blockchain. In addition to GPS data and peer data being used to determine whether the vehicles are actively participating in the platoon, another set of data may be used to track progress an ensure safety and compliance, such as engine sensors to measure heat, tire sensors to measure revolutions per minute (RPMs) and tire pressure, etc. This sensor data may be collectively shared for each vehicle and in periodic intervals to ensure compliance and safety measures with other members.

Figure 6A:
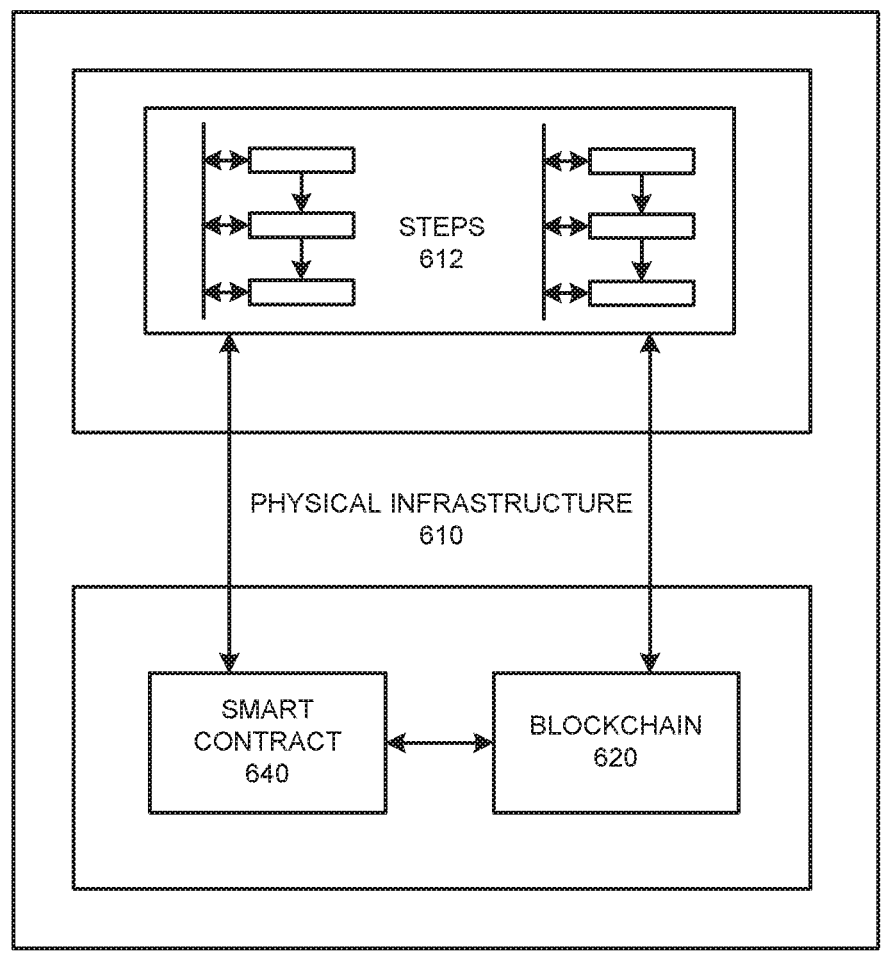
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
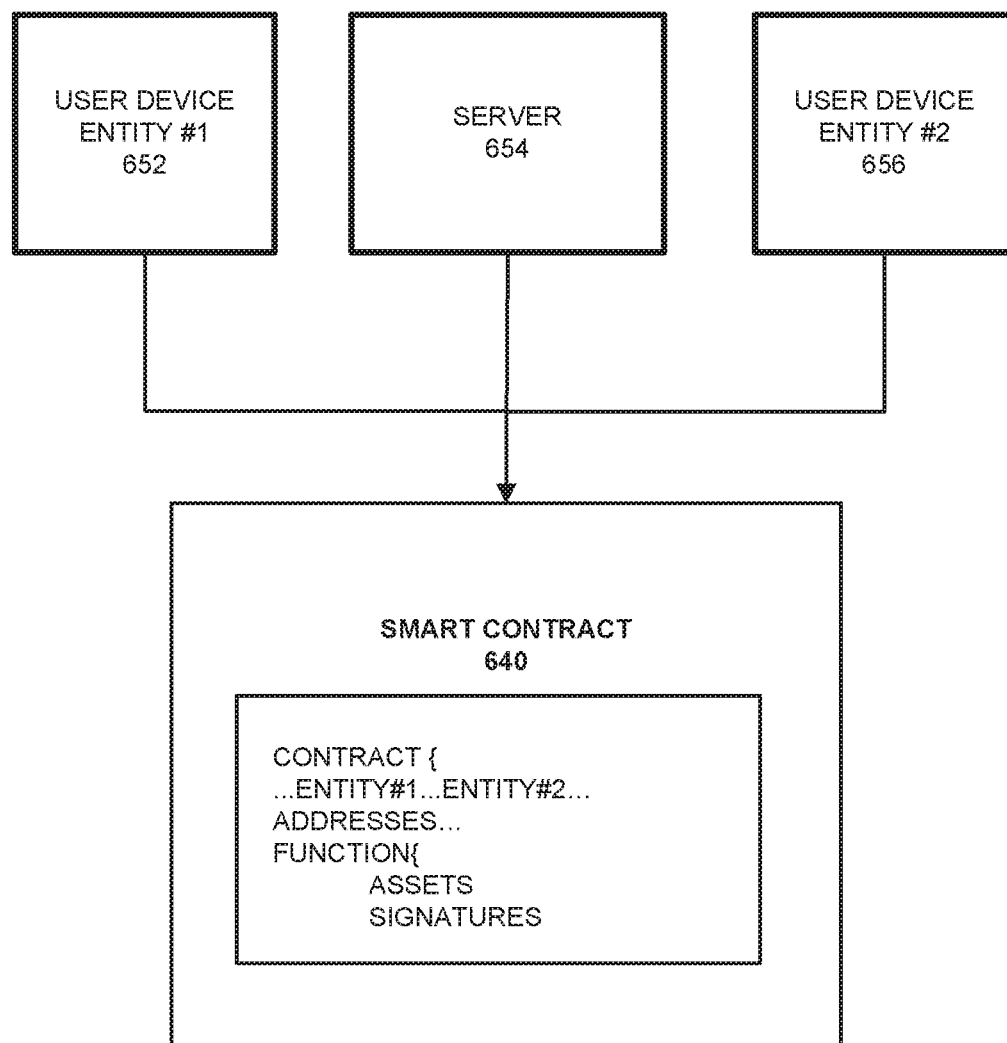
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 600B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
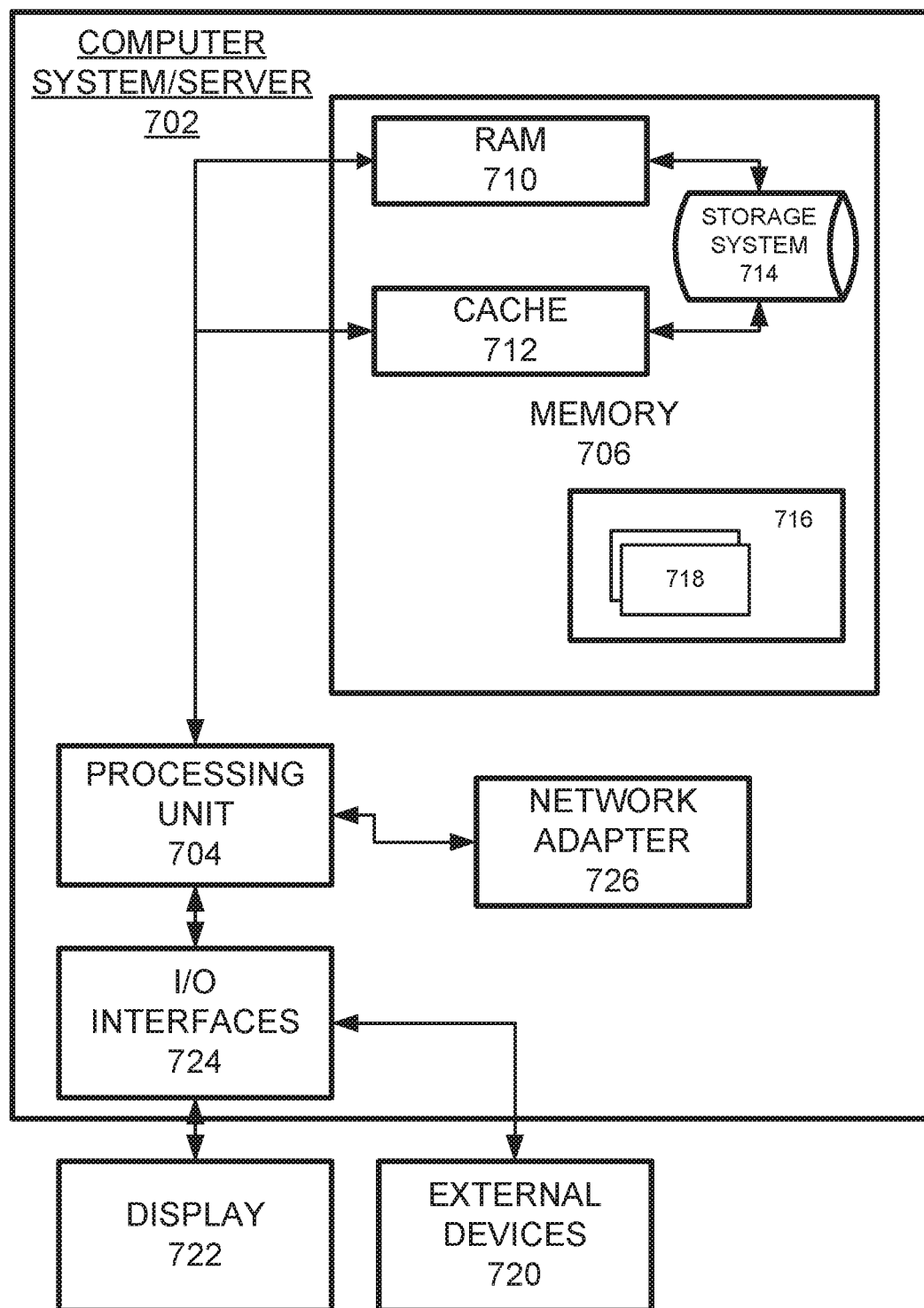
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    creating a vehicle platoon comprising a smart contract assigned thereto which is stored on and runs on a blockchain ledger;
    receiving a plurality of requests from a plurality of vehicles to join the vehicle platoon;
    identifying a vehicle from among the plurality of vehicles that is ineligible to join the vehicle platoon based on a comparison of a type of the vehicle to ineligible vehicle types stored as terms in the smart contract;
    registering, via the smart contract, the plurality of vehicles with the vehicle platoon, wherein the registering comprises committing one or more blockchain transactions for the registration of the plurality of vehicles to the blockchain ledger;
    iteratively identifying that a first vehicle is a current lead vehicle in the vehicle platoon, and in response to the iteratively identifying, iteratively increasing a rank of the first vehicle with respect to other vehicles in the vehicle platoon which are currently following the first vehicle;
    determining to select a second vehicle from among the other vehicles as a new leader for the vehicle platoon based on the iteratively increased rank of the first vehicle becoming greater than a rank of the second vehicle by a threshold level; and
    determining a new position of the first vehicle within the vehicle platoon based on the determination and commit the new position to the blockchain ledger.

2. The method of claim 1, wherein the method further comprises identifying a task being performed by the vehicle platoon.

3. The method of claim 2, further comprising:
    identifying position data of vehicles within the vehicle platoon when participating in the task.

4. The method of claim 1, further comprising tracking position data of the current lead vehicle and one or more following vehicles in the vehicle platoon, and storing the tracked position data in the blockchain ledger.

5. The method of claim 1, wherein the plurality of vehicles comprise a plurality of blockchain members in the vehicle platoon.

6. The method of claim 1, further comprising:
    storing one or more blockchain transactions that identify one or more blockchain members which correspond to one or more other vehicles.

7. The method of claim 1, further comprising determining a blockchain member corresponding to the current lead vehicle and storing a blockchain transaction that identifies the blockchain member.

8. A system, comprising:
a processor configured to
create a vehicle platoon comprising a smart contract assigned thereto which is stored on and runs on a blockchain ledger;
receive a plurality of requests from a plurality of vehicles to join the vehicle platoon;
identify a vehicle from among the plurality of vehicles that is ineligible to join the vehicle platoon based on a comparison of a type of the vehicle to ineligible vehicle types stored as terms in the smart contract;
register, via the smart contract, the plurality of vehicles with the vehicle platoon, wherein the registering comprises committing a plurality of blockchain transactions for the registration of the plurality of vehicles to the blockchain ledger;
iteratively identify that a first vehicle is a current lead vehicle in the vehicle platoon, and in response to the iteratively identifying, iteratively increase a rank of the first vehicle with respect to other vehicles in the vehicle platoon which are currently following the first vehicle;
select a second vehicle from among the other vehicles as a new leader for the vehicle platoon based on the iteratively increased rank of the first vehicle becoming greater than a rank of the second vehicle by a threshold level; and
determine a new position of the first vehicle within the vehicle platoon based on the determination and commit the new position to the blockchain ledger.

9. The system of claim 8, wherein the processor is further configured to identify a task performed by the vehicle platoon.

10. The system of claim 9, wherein the processor is further configured to identify position data of vehicles within the vehicle platoon when participating in the task.

11. The system of claim 8, wherein the processor is further configured to track position data of the current lead vehicle and one or more following vehicles in the vehicle platoon, and store the tracked position data in the blockchain ledger.

12. The system of claim 8, wherein the plurality of vehicles comprise a plurality of blockchain members in the vehicle platoon.

13. The system of claim 8, wherein the processor is further configured to store blockchain transactions that identify the blockchain members which participated as followers.

14. The system of claim 8, wherein the processor is further configured to determine a blockchain member corresponding to the current lead vehicle in the vehicle platoon, and store a blockchain transaction that identifies the blockchain member.

15. A non-transitory computer readable storage medium configured to store instructions that when executed cause a processor to perform:
creating a vehicle platoon comprising a smart contract assigned thereto which is stored on and runs on a blockchain ledger;
receiving a plurality of requests from a plurality of vehicles to join the vehicle platoon;
identifying a vehicle from among the plurality of vehicles that is ineligible to join the vehicle platoon based on a comparison of a type of the vehicle to ineligible vehicle types stored as terms in the smart contract;
registering, via the smart contract, the plurality of vehicles with the vehicle platoon, wherein the registering comprises committing one or more blockchain transactions for the registration of the plurality of vehicles to the blockchain ledger;
iteratively identifying that a first vehicle is a current lead vehicle in the vehicle platoon and in response to the iteratively identifying, iteratively increasing a rank of the first vehicle with respect to other vehicles in the vehicle platoon which are currently following the first vehicle;
selecting a second vehicle from among the other vehicles as a new leader for the vehicle platoon based on the iteratively increased rank of the first vehicle becoming greater than a rank of the second vehicle by a threshold level; and
determining a new position of the first vehicle within the vehicle platoon based on the determination and commit the new position to the blockchain ledger.

16. The non-transitory computer readable storage medium of claim 15, wherein the processor is further configured to perform identifying a task being performed by the vehicle platoon.

17. The non-transitory computer readable storage medium of claim 16, wherein the processor is further configured to perform:
identifying position data of vehicles within the vehicle platoon when participating in the task.

18. The non-transitory computer readable storage medium of claim 15, wherein the processor is further configured to perform:
tracking the position data of the current lead vehicle and one or more following vehicles in the vehicle platoon and storing the tracked position data in the blockchain ledger.

19. The non-transitory computer readable storage medium of claim 15, wherein the plurality of vehicles comprise a plurality of blockchain members in the vehicle platoon.

20. The non-transitory computer readable storage medium of claim 15, wherein the processor is further configured to perform:
determining blockchain members that participated as followers or leaders in the vehicle platoon; and
storing blockchain transactions identifying the blockchain members which participated as followers or leaders.

* * * * *